E. R. CHITTENDEN.
SPRING HOOK.
APPLICATION FILED APR. 9, 1909.

1,059,117.

Patented Apr. 15, 1913.

Witnesses:
M. E. Shook
Ernest R. Hutchinson

Inventor:
Eason Roberts Chittenden,
By Edson Bro's,
Attorneys.

UNITED STATES PATENT OFFICE.

EASON ROBERTS CHITTENDEN, OF SURBITON, ENGLAND.

SPRING-HOOK.

1,059,117.  Specification of Letters Patent.  Patented Apr. 15, 1913.

Application filed April 9, 1909. Serial No. 488,922.

*To all whom it may concern:*

Be it known that I, EASON ROBERTS CHITTENDEN, a subject of the King of Great Britain, residing at Hawkhurst, Ditton Road, Surbiton, in the county of Surrey, England, have invented certain new and useful Improvements in Spring-Hooks, of which the following is a specification.

My invention relates to hooks of the kind in which a spring tongue for closing the hook passes through an opening in the shank and is supported laterally thereby, and is also supported on its upper edge by the shank and is withdrawn into the recess in the shank to open the hook as hereinafter described.

My invention consists in a shank and a spring riveted or otherwise attached to each other.

The invention consists, therefore, of a slotted shank provided with a hook portion, the shank having a forward extension toward the hook portion, a locking tongue mounted for movement transverse of the length of the shank to close a passage between the forward extension and the hook portion, and resilient means to maintain the tongue in a position to close the opening.

In the accompanying drawing, I have illustrated one embodiment of the invention, and in which—

Figure 1:
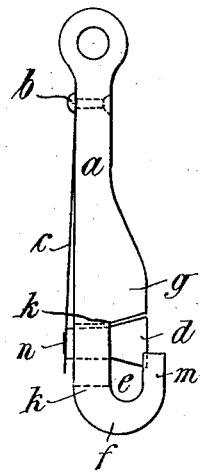
Figure 2:
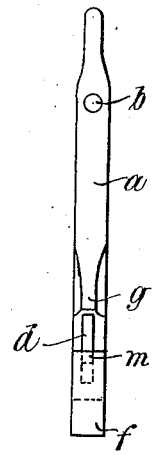

Figure 1 is a side elevation, and Fig. 2 is a front elevation of the device.

The hook is provided with any suitable means for attaching the same to a connecting element, such as a chain, and is provided with an elongated shank $a$ having a hook portion $f$, which hook terminates at a point $m$ forming an aperture $e$. The shank is provided with a projection $g$ which extends forwardly toward the hook portion $f$ with the inner part of the end of the hook portion substantially in longitudinal alinement with the end of the projection $g$. A slot, indicated at $k, k$, is found in the shank in substantial transverse alinement with the end $m$ of the hook portion.

A locking tongue $d$ is longitudinally displaceably mounted for movement in the slot $k$, into and out of the opening between the end of the projection $g$ and the end $m$ of the hook member $f$, the tongue being held in a position to close said opening by a spring $c$. When in its closed position the outer and lower end of the tongue $d$ is in contact with the inner part of the end of the hook $m$, with the front face thereof preferably forming a continuation of the front face of the projection $g$. If desired, the inner wall of the end of the hook may be slotted to allow the tongue to enter therein. The spring $c$ is preferably a leaf spring and is shown secured near one end to the shank by a rivet $b$ and connected at its outer end to the tongue $n$. The tongue $d$ is so shaped that when in its closed position, it is supported at its rear portion by the wall $k$ of the slot, while the front portion of the tongue is adapted to rest upon the projection $g$.

To insert an object, such as a ring, into the aperture $e$, the object is pressed against the locking tongue $d$ which falls back into the recess $k$ thereby allowing the object to be inserted without difficulty. In releasing the object from engagement with the hook, the tongue $d$ is withdrawn into the shank $a$ by pulling the spring $c$ away from the shank $a$ at the point $n$, whereupon the object may be pulled simultaneously in the opposite direction and thereby released from engagement with the hook.

What I claim and desire to secure by Letters Patent of the United States is:—

A spring hook having a slotted shank and a hook portion, a projection on said shank extending forward thereof toward the hook portion to form an opening therebetween, the inner part of the end of the hook portion being substantially in longitudinal alinement with the end of said projection and also in transverse alinement with the slot of said shank, a locking tongue longitudinally displaceably mounted for movement in said slot into and out of said opening, and a spring adapted to engage said tongue to so hold the same that its outer and lower end is in contact with the inner part of the end of the hook portion, and that the front face of the tongue forms a continuation of the front face of said projection, said tongue being supported, at its rear portion, by the walls of said slot, and, at its front portion and for the whole of its length, by said projection.

In testimony whereof I affix my signature in presence of two witnesses.

EASON ROBERTS CHITTENDEN.

Witnesses:
T. SELBY WARDLE,
ALLAN J. OATLEY WADMAN.

Copies of this patent may be obtained for five cents each, by addressing the "Commissioner of Patents, Washington, D. C."